(12) United States Patent
Yeh

(10) Patent No.: US 10,474,254 B2
(45) Date of Patent: Nov. 12, 2019

(54) TIP STRUCTURE OF STYLUS FOR DETERMINING AXIAL DIRECTION AND ANGLE OF INCLINATION OF THE STYLUS

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 15/785,541

(22) Filed: Oct. 17, 2017

(65) Prior Publication Data
US 2018/0107293 A1 Apr. 19, 2018

Related U.S. Application Data

(60) Provisional application No. 62/408,950, filed on Oct. 17, 2016.

(51) Int. Cl.
*G06F 3/044* (2006.01)
*G06F 3/041* (2006.01)
*G06F 3/0354* (2013.01)
*H01F 38/14* (2006.01)

(52) U.S. Cl.
CPC ......... *G06F 3/03545* (2013.01); *H01F 38/14* (2013.01); *H01F 2038/143* (2013.01)

(58) Field of Classification Search
CPC .... G06F 3/044; G06F 3/03545; G06F 3/0383; G06F 3/046; G06F 3/0433; G06F 3/016; G06F 3/041; G06F 3/0354; H01F 38/14; H01F 2038/143
See application file for complete search history.

(56) References Cited

U.S. PATENT DOCUMENTS

| 2004/0240925 A1* | 12/2004 | Iida | B43K 5/005 401/41 |
|---|---|---|---|
| 2013/0249870 A1* | 9/2013 | Slaby | G06F 3/044 345/179 |
| 2014/0267070 A1* | 9/2014 | Shahparnia | G06F 3/046 345/173 |
| 2014/0267187 A1* | 9/2014 | Cooke | G06F 3/044 345/179 |
| 2014/0300586 A1* | 10/2014 | Dowd | G06F 3/03545 345/179 |
| 2014/0306929 A1* | 10/2014 | Huang | G06F 3/03545 345/174 |
| 2014/0347298 A1* | 11/2014 | Park | G06F 3/016 345/173 |

(Continued)

*Primary Examiner* — Jennifer Mehmood
*Assistant Examiner* — James S Nokham
(74) *Attorney, Agent, or Firm* — WPAT, PC

(57) ABSTRACT

A stylus used to have a touch sensitive processing apparatus determine an axial direction and an angle of inclination which the stylus corresponds to a touch screen through electrical signal emitted by the stylus. The stylus includes: a penholder; a tip section on one end of the penholder; a first ring electrode surrounding the penholder; a second ring electrode surrounding the penholder, wherein the second ring electrode is closer to the tip section than the first ring electrode being, the first ring electrode and the second ring electrode are used to emit the electrical signal; and a first insulating material configured to have the first ring electrode electrically decouple the second ring electrode.

15 Claims, 2 Drawing Sheets

(56) References Cited

U.S. PATENT DOCUMENTS

| | | | |
|---|---|---|---|
| 2016/0209957 A1* | 7/2016 | Jung | G06F 3/044 |
| 2016/0216784 A1* | 7/2016 | Kim | G06F 3/03545 |
| 2016/0266663 A1* | 9/2016 | Holsen | G06F 3/044 |
| 2016/0313812 A1* | 10/2016 | Katsurahira | G06F 3/0383 |
| 2017/0068337 A1* | 3/2017 | Bhandari | G06F 3/044 |
| 2017/0068345 A1* | 3/2017 | Barel | G06F 3/03545 |
| 2017/0083164 A1* | 3/2017 | Sheng | G06F 3/0433 |
| 2017/0242501 A1* | 8/2017 | Tang | G06F 3/03545 |
| 2017/0357338 A1* | 12/2017 | Bell | G06F 3/03545 |

\* cited by examiner

TIP STRUCTURE OF STYLUS FOR DETERMINING AXIAL DIRECTION AND ANGLE OF INCLINATION OF THE STYLUS

CROSS REFERENCE TO RELATED APPLICATIONS

The present application claims priority benefit of U.S. provisional patent application No. 62/408,950, filed on Oct. 17, 2016.

BACKGROUND OF THE INVENTION

1. Field of the Invention

The present invention relates to the field of stylus, and more particularly, to stylus which can have a touch screen or panel detect axial direction and/or angle of inclination which the stylus corresponds to the touch screen.

2. Description of the Prior Art

Touch panels or screens (thereinafter touch screens) have already been one of the main input/output devices of modern electronic systems. As far as the electronic system is concerned, if axial or longitudinal direction and/or angle of inclination which a stylus corresponds to a touch screen can be detected, more control items or options may be provided to user(s) in using the stylus, to enrich input choices and conveniences.

In an earlier patent application, Applicant has already disclosed that using a tip section and a ring electrode surrounding the tip section to emit electrical signal may make a touch screen detect the electrical signal emitted from these two electrodes so that the axial direction and/or the angle of inclination that the stylus corresponds to the touch screen can be detected.

However, in the technical solution provided previously, the tip section must be a conductor, and thus the material of the tip section is quite limited to. The material of a conductive tip section has big difference in property to that of the tips of a general marker, pencil, ballpoint, fountain pen, and even writing brush, especially in, e.g., elasticity, rigidity, length, shape, and etc.

Even though the touch screen may simulate strokes of the various pens mentioned above according to the parameter(s) of the axial direction and/or the angle of inclination, and etc., user(s) may still need to practice for a long time to get used to the stylus with the conductive tip section to write on the touch screen having a smooth surface.

Therefore, if the tip section of the stylus can be made of traditional material, in addition to writing, and still making the touch screen be able to detect the axial direction and/or the angle of inclination the stylus corresponds to the touch screen, better user experiences for using the stylus can be provided.

SUMMARY OF THE INVENTION

According to one embodiment of the present invention, it provides a stylus used to have a touch sensitive processing apparatus determine an axial direction and an angle of inclination which the stylus corresponds to a touch screen through electrical signal emitted by the stylus. The stylus includes: a penholder; a tip section on one end of the penholder; a first ring electrode surrounding the penholder; a second ring electrode surrounding the penholder, wherein the second ring electrode is closer to the tip section than the first ring electrode being, the first ring electrode and the second ring electrode are used to emit the electrical signal; and a first insulating material configured to have the first ring electrode electrically decouple the second ring electrode.

In a varied embodiment, for providing more precise tip position, the stylus further includes a second insulating material configured to have the second ring electrode electrically decouple the tip section, wherein the tip section is conductor. In a varied embodiment, for providing more precise tip position, the tip section emits the electrical signal.

In a varied embodiment, for having the touch sensitive processing apparatus determine an angle of rotation which the stylus corresponds to the touch screen, the first ring electrode includes multiple electrodes surrounding the penholder, these electrodes decouple to each other.

In a varied embodiment, for having the touch sensitive processing apparatus determine an angle of rotation which the stylus corresponds to the touch screen, the second ring electrode includes multiple electrodes surrounding the penholder, these electrodes decouple to each other.

In a varied embodiment, for having the touch sensitive processing apparatus determine an angle of rotation which the stylus corresponds to the touch screen, the first ring electrode includes multiple electrodes, the second ring electrode includes multiple electrodes, numbers of the first ring electrodes are equal to that of the second ring electrodes. In a varied embodiment, for lowing the cost of design and manufacture, a position of each first ring electrode corresponds a position of one of the second ring electrode.

In a varied embodiment, for having the touch sensitive processing apparatus determine an angle of rotation which the stylus corresponds to the touch screen, the first ring electrode includes multiple electrodes, the second ring electrode includes multiple electrodes, numbers of the first ring electrodes are not equal to that of the second ring electrodes. Numbers of both electrodes being unequal can increase the precision that the touch sensitive processing apparatus calculates the angle of rotation.

In a varied embodiment, for providing various user writing experiences and having user to continue the using experience for old style, the tip section includes one of the tip structure as below: pencil; ballpoint; fountain pen; marker; and writing brush. In a varied embodiment, for being able to be used on the touch panel or touch screen, when the tip section is one of the tip structure of ballpoint, fountain pen, marker, or writing brush, and the tip section does not connect to an ink container, the tip section writes on the touch screen without leaving trace. In a varied embodiment, for being able to be written on a general paper or special touch screen, when the tip section is one of the tip structure of ballpoint, fountain pen, marker, or writing brush, the tip section connects to an ink container to absorb and diffuse ink. In a varied embodiment, for changing a worn tip section, the tip section is changeable.

In a varied embodiment, for providing power to the stylus, the stylus further includes a power module configured to supply power for the stylus to emit the electrical signal. The stylus may actively emit the electrical signal. Its feature is that no matter receiving the electrical signal from touch panel/screen or other source, it can actively emit the electrical signal from the first ring electrode, the second ring electrode and/or the tip section. For example, when the stylus does not touch the touch screen, it emits the electrical signal as well.

In a varied embodiment, for having the touch sensitive processing apparatus determine tip position, axial direction, angle of inclination, angle of rotation, angular rate of the angle of rotation which the stylus corresponds to the touch screen, and states of various buttons or sensors on the stylus, and pressure value of the tip of the stylus and some states that could happen to the stylus, the electrical signal performs modulation on code, time, frequency, and/or amplitude.

According to one embodiment of the present invention, it provides a tip structure of a stylus used to have a touch sensitive processing apparatus determine an axial direction and an angle of inclination which the stylus corresponds to a touch screen through electrical signal emitted by the tip structure. The tip structure includes: a tip section on one end of a penholder; a first ring electrode surrounding the penholder; a second ring electrode surrounding the penholder, wherein the second ring electrode is closer to the tip section than the first ring electrode being, the first ring electrode and the second ring electrode are used to emit the electrical signal; and a first insulating material configured to have the first ring electrode electrically decouple the second ring electrode.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
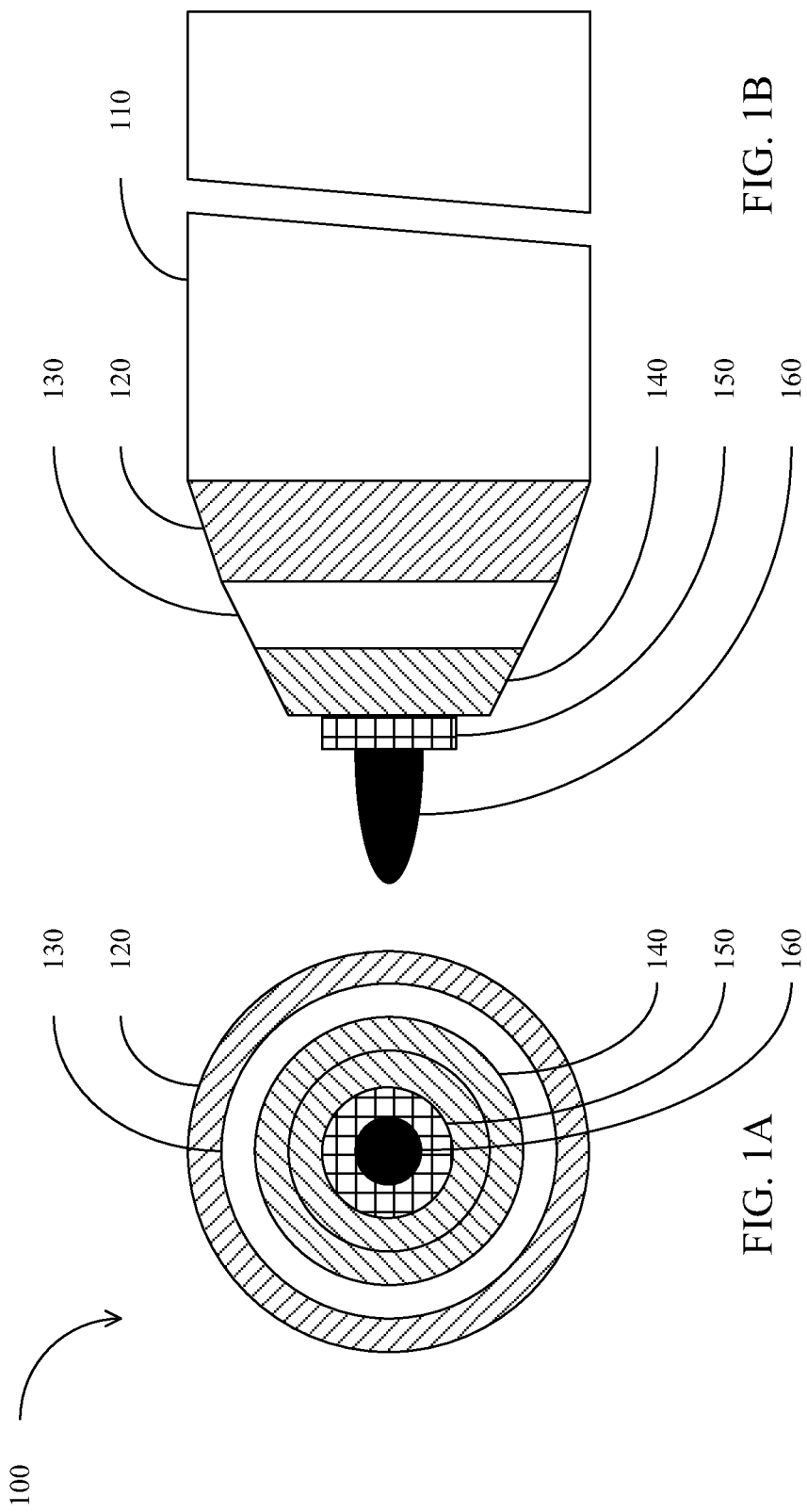
FIG. 1A illustrates a front view of a tip structure of a stylus 100 according to an embodiment of the present invention.
FIG. 1B illustrates a side view of a tip structure of a stylus 100 according to an embodiment of the present invention and FIG. 2 illustrates a tip structure of a stylus 200 according to an embodiment of the present invention.

Some embodiments of the present invention are described in detail below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Referring to FIGS. 1A and 1B, they show a tip structure of a stylus 100 according to an embodiment of the present invention. FIG. 1A is the front view of the tip of the stylus 100; and FIG. 1B is the side view of the stylus 100. The stylus 100 includes a penholder 110 (or a shaft or a body) and a tip structure. The diameter of the tip structure may be decreased gradually. The tip structure includes a first ring electrode 120, a second ring electrode 140, and a tip section 160. Compared to the first ring electrode 120, the second ring electrode 140 is closer to the tip section 160.

The stylus 100 may include a first insulating material 130 configured to make the first ring electrode 120 electrically decouple the second ring electrode 140. In an embodiment, when the tip section 160 is conductive material, the stylus 100 may include a second insulating material 150 configured to make the tip section 160 electrically decouple the second ring electrode 140. In another embodiment, when the tip section 160 is not conductive material, the stylus 100 may not include the second insulating material 150 and make the tip section 160 directly contact the second ring electrode 140.

The first ring electrode 120 may surround the tip structure in a circle or be divided into multiple electrodes to surround the tip structure. Similarly, the second ring electrode 140 may surround the tip structure in a circle or be divided into multiple electrodes to surround the tip structure.

Figure 2:
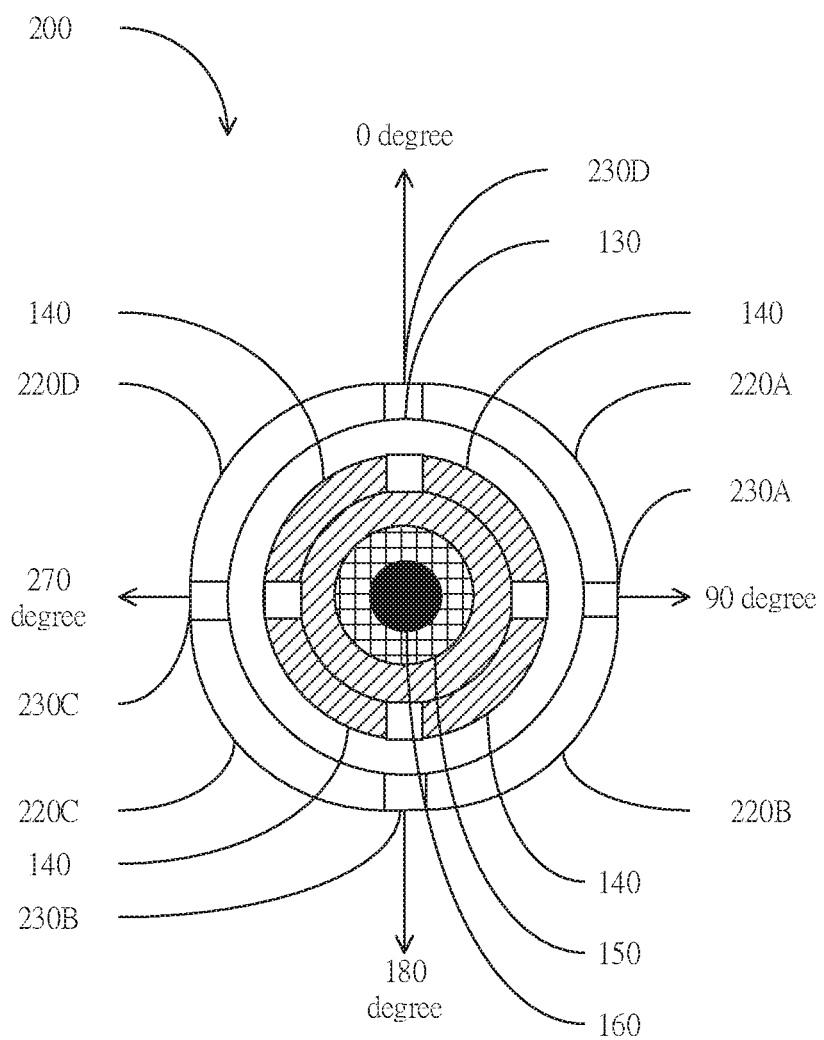

Referring to FIG. 2, it shows a tip structure of a stylus 200 according to an embodiment of the present invention. The difference between FIG. 2 and the FIG. 1A is that there are four first ring electrodes 220A-D shown in the FIG. 2 compared to the only single first ring electrode 120 shown in the FIGS. 1A and 1B. In between the four first ring electrodes 220A-D, there are four third insulating materials 230A-D configured to make each of the first ring electrodes electrically decouple.

Although the FIG. 2 does not show multiple second ring electrodes 140, Applicant thinks the person with ordinary skill in the art can easily appreciate that the embodiments of multiple second ring electrodes with multiple insulating materials there between correspondingly to make each of the second ring electrodes electrically decouple. Besides, the first ring electrodes may not be four and may be more than two in design. Likewise, the second ring electrodes may not be four and may be more than two in design. In an embodiment, the numbers of the first ring electrodes may be equal to that of the second ring electrodes but the position of each first ring electrode may not absolutely align to corresponding second ring electrode. In another embodiment, the numbers of the first ring electrodes may not be equal to that of the second ring electrodes. In one embodiment, the stylus may include single first ring electrode and multiple second ring electrodes.

When the stylus 200 includes multiple first ring electrodes, it may perform modulation on code, time, frequency, and/or amplitude (that is, e.g., code division multiplexing (CDM), time division multiplexing (TDM), frequency division multiplexing (FDM), and/or amplitude division multiplexing (ADM), respectively) of the electrical signals to make the touch screen be able to determine that which one of the first ring electrodes is closer to the touch screen according to the electrical signals respectively emitted from the multiple first ring electrodes so that which side of the stylus 200 approaching the touch screen can be known. As shown in FIG. 2, it may make the shaft of the stylus 200 be an axis, and the upper side is the angle of pen rotation in 0 degree; the right side is the angle of pen rotation in 90 degrees; the bottom side is the angle of pen rotation in 180 degrees; and the left side is the angle of pen rotation in 270 degrees.

Also, when the stylus 200 includes multiple second ring electrodes, it may perform modulation on code, time, frequency, and/or amplitude of the electrical signals to make the touch screen be able to determine that which one of the second ring electrodes is closer to the touch screen according to the electrical signals respectively emitted from the multiple second ring electrodes so that which angle of the stylus 200 approaching the touch screen can be determined. When the stylus 200 includes multiple first ring electrodes and multiple second ring electrodes, the touch screen may further precisely determine the angle of pen rotation which the stylus 200 approaches the touch screen. As mentioned above, the patent application applied by Applicant also disclosed that the position, the axial direction, and/or the angle of inclination of the tip of the stylus 200 can be determined by using the electrical signals respectively emitted from the first ring electrodes and the second ring electrodes.

The tip section 160 may be made of conductive or non-conductive material or may be configured with known tip material or structure, such as the abovementioned pencil, ballpoint, fountain pen, and even writing brush. In one embodiment, the tip section 160 may use marker material. When inked cotton sliver is not installed to the back of the marker material of the tip section 160, it may write on the touch screen without leaving trace. When inked cotton sliver is installed to the back of the marker material of the tip section 160, it may write on a whiteboard laying or coating touch sensitive electrodes. This whiteboard may connect to a touch sensitive processing apparatus or integrated circuit (IC) to be used as a touch sensitive panel. In addition, when the dyestuff written by the tip section on the surface material of the touch screen can be easily erased, the stylus is even allowed to directly write on the surface of the touch screen.

The stylus may be wired or wireless. The electrical signal may be actively or passively emitted from the stylus. It may use electromagnetic resonance effect to sense the electrical signal emitted from the touch screen and then to passively emit the electrical signal from the stylus. A signal source is installed in an active stylus. A signal source is not installed in a passive stylus. The abovementioned first ring electrode(s) 120 and the second ring electrode(s) 140 may be used to emit or to receive the electrical signal. The stylus may make the first ring electrode(s) 120 and the second ring electrode(s) 140 emit the electrical signal(s), be grounded, or float the voltage thereof.

In one embodiment, the tip section 160 is changeable, e.g., drawn out and replaced. For example, when the marker material of the tip section 160 is worn out, the worn tip section 160 can be drawn out and replaced with a new tip section 160.

In another embodiment, length of the tip section 160 is adjustable. Since the length of the tip section 160 may affect the touch screen's determination of the position and the angle of inclination of the tip of the stylus, a calibration process may be performed when the tip section 160 has been changed or the length of the tip section has been adjusted. This process makes the touch sensitive processing apparatus of the touch screen be able to determine the length of the tip section 160 to precisely determine the position and the angle of inclination of the tip of the stylus.

According to one embodiment of the present invention, it provides a stylus used to have a touch sensitive processing apparatus determine an axial direction and an angle of inclination which the stylus corresponds to a touch screen through electrical signal emitted by the stylus. The stylus includes: a penholder; a tip section on one end of the penholder; a first ring electrode surrounding the penholder; a second ring electrode surrounding the penholder, wherein the second ring electrode is closer to the tip section than the first ring electrode being, the first ring electrode and the second ring electrode are used to emit the electrical signal; and a first insulating material configured to have the first ring electrode electrically decouple the second ring electrode.

In a varied embodiment, for providing more precise tip position, the stylus further includes a second insulating material configured to have the second ring electrode electrically decouple the tip section, wherein the tip section is conductor. In a varied embodiment, for providing more precise tip position, the tip section emits the electrical signal.

In a varied embodiment, for having the touch sensitive processing apparatus determine an angle of rotation which the stylus corresponds to the touch screen, the first ring electrode includes multiple electrodes surrounding the penholder, these electrodes decouple to each other.

In a varied embodiment, for having the touch sensitive processing apparatus determine an angle of rotation which the stylus corresponds to the touch screen, the second ring electrode includes multiple electrodes surrounding the penholder, these electrodes decouple to each other.

In a varied embodiment, for having the touch sensitive processing apparatus determine an angle of rotation which the stylus corresponds to the touch screen, the first ring electrode includes multiple electrodes, the second ring electrode includes multiple electrodes, numbers of the first ring electrodes are equal to that of the second ring electrodes. In a varied embodiment, for lowing the cost of design and manufacture, a position of each first ring electrode corresponds a position of one of the second ring electrode.

In a varied embodiment, for having the touch sensitive processing apparatus determine an angle of rotation which the stylus corresponds to the touch screen, the first ring electrode includes multiple electrodes, the second ring electrode includes multiple electrodes, numbers of the first ring electrodes are not equal to that of the second ring electrodes. Numbers of both electrodes being unequal can increase the precision that the touch sensitive processing apparatus calculates the angle of rotation.

In a varied embodiment, for providing various user writing experiences and having user to continue the using experience for old style, the tip section includes one of the tip structure as below: pencil, ballpoint, fountain pen, marker, and writing brush. In a varied embodiment, for being able to be used on the touch panel or touch screen, when the tip section is one of the tip structure of ballpoint, fountain pen, marker, or writing brush, and the tip section does not connect to an ink container, the tip section writes on the touch screen without leaving trace. In a varied embodiment, for being able to be written on a general paper or special touch screen, when the tip section is one of the tip structure of ballpoint, fountain pen, marker, or writing brush, the tip section connects to an ink container to absorb and diffuse ink. In a varied embodiment, for changing a worn tip section, the tip section is changeable.

In a varied embodiment, for providing power to the stylus, the stylus further includes a power module configured to supply power for the stylus to emit the electrical signal. The stylus may be the stylus actively emitting the electrical signal. Its feature is that no matter receiving the electrical signal from touch panel/screen or other source, it can actively emit the electrical signal from the first ring electrode, the second ring electrode and/or the tip section. For example, when the stylus does not touch the touch screen, it emits the electrical signal as well.

In a varied embodiment, for having the touch sensitive processing apparatus determine tip position, axial direction, angle of inclination, angle of rotation, angular rate of the angle of rotation which the stylus corresponds to the touch screen, and states of various buttons or sensors on the stylus, and pressure value of the tip of the stylus and some states that could happen to the stylus, the electrical signal performs modulation on code, time, frequency, and/or amplitude.

The electrical signal may be digital signal or analog signal. In one embodiment, with performing on code modulation, the first ring electrode, the second ring electrode and/or the tip section emit the electrical signal with different code at the same time. According to projection area of these different coding signal and the center of the projection area, the tip position, the axial direction, the angle of inclination which the stylus corresponds to the touch screen can be calculated. When the first ring electrode and/or the second ring electrode includes multiple electrodes, the electrodes of the first ring electrode, the electrodes of the second ring electrode and/or the tip section simultaneously emit the electrical signal with different code. According to projection area of these different coding signal and the center of the projection area, the angle of rotation which the stylus corresponds to the touch screen can be calculated.

In one embodiment, with performing on time modulation, the first ring electrode, the second ring electrode and/or the tip section emit the electrical signal in turn on time division. According to projection area of these different timing signal and the center of the projection area, the tip position, the axial direction, the angle of inclination which the stylus corresponds to the touch screen can be calculated. When the first ring electrode and/or the second ring electrode includes multiple electrodes, the electrodes of the first ring electrode, the electrodes of the second ring electrode and/or the tip section emit the same electrical signal in different time. According to projection area of these different timing signal and the center of the projection area, the angle of rotation which the stylus corresponds to the touch screen can be calculated.

In one embodiment, with performing on frequency modulation, the first ring electrode, the second ring electrode and/or the tip section emit the electrical signal in different frequency. According to projection area of these different frequency signal and the center of the projection area, the tip position, the axial direction, the angle of inclination which the stylus corresponds to the touch screen can be calculated. When the first ring electrode and/or the second ring electrode includes multiple electrodes, the electrodes of the first ring electrode, the electrodes of the second ring electrode and/or the tip section emit the electrical signal in different frequency. According to projection area of these different frequency signal and the center of the projection area, the angle of rotation which the stylus corresponds to the touch screen can be calculated.

In one embodiment, with performing on amplitude modulation, the first ring electrode, the second ring electrode and/or the tip section emit the electrical signal with different amplitude. According to projection area of these different amplitude signal and the center of the projection area, the tip position, the axial direction, the angle of inclination which the stylus corresponds to the touch screen can be calculated. When the first ring electrode and/or the second ring electrode includes multiple electrodes, the electrodes of the first ring electrode, the electrodes of the second ring electrode and/or the tip section emit the electrical signal with different amplitude. According to projection area of these different amplitude signal and the center of the projection area, the angle of rotation which the stylus corresponds to the touch screen can be calculated.

In one embodiment, two or more than two modulations in the four abovementioned modulations may be performed to calculate the tip position, the axial direction, the angle of inclination, and the angle of rotation which the stylus corresponds to the touch screen.

According to one embodiment of the present invention, it provides a tip structure of a stylus used to have a touch sensitive processing apparatus determine an axial direction and an angle of inclination which the stylus corresponds to a touch screen through electrical signal emitted by the tip structure. The tip structure includes: a tip section on one end of a penholder; a first ring electrode surrounding the penholder; a second ring electrode surrounding the penholder, wherein the second ring electrode is closer to the tip section than the first ring electrode being, the first ring electrode and the second ring electrode are used to emit the electrical signal; and a first insulating material configured to have the first ring electrode electrically decouple the second ring electrode.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A stylus used to have a touch sensitive processing apparatus determine an axial direction and an angle of inclination which the stylus corresponds to a touch screen through electrical signal emitted by the stylus, the stylus comprising:
   a penholder;
   a non-conductive tip section on one end of the penholder;
   a first ring electrode surrounding the penholder;
   a second ring electrode surrounding the penholder, wherein the second ring electrode is closer to the tip section than the first ring electrode being, the first ring electrode and the second ring electrode are used to emit the electrical signal, wherein the second ring electrode is in direct contact with the tip section; and
   a first insulating material configured to have the first ring electrode electrically decouple the second ring electrode.

2. The stylus of claim 1, wherein the first ring electrode comprises a plurality of electrodes surrounding the penholder, the plurality of electrodes decouple to each other.

3. The stylus of claim 1, wherein the second ring electrode comprises a plurality of electrodes surrounding the penholder, the plurality of electrodes decouple to each other.

4. The stylus of claim 3, wherein the stylus performs modulation on the electrical signal using code, time, frequency, or amplitude prior to emission using code division multiplexing, time division multiplexing, frequency division multiplexing, or amplitude division multiplexing, respectively.

5. The stylus of claim 1, wherein the first ring electrode comprises a plurality of electrodes, the second ring electrode comprises a plurality of electrodes, numbers of the first ring electrodes are equal to that of the second ring electrodes.

6. The stylus of claim 5, wherein a position of each first ring electrode corresponds a position of one of the second ring electrodes.

7. The stylus of claim 5, wherein the stylus performs modulation on the electrical signal using code, time, frequency, or amplitude prior to emission using code division multiplexing, time division multiplexing, frequency division multiplexing, or amplitude division multiplexing, respectively.

8. The stylus of claim 1, wherein the first ring electrode comprises a plurality of electrodes, the second ring electrode comprises a plurality of electrodes, numbers of the first ring electrodes are not equal to that of the second ring electrodes.

9. The stylus of claim 1, wherein the tip section comprises one of the tip structures as below: marker and writing brush.

10. The stylus of claim 9, wherein when the tip section is one of the tip structures of marker and writing brush, and the tip section does not connect to an ink container, the tip section writes on the touch screen without leaving trace.

11. The stylus of claim 9, wherein when the tip section is one of the tip structures of marker and writing brush, the tip section connects to an ink container to absorb and diffuse ink.

12. The stylus of claim 9, wherein the tip section is changeable.

13. The stylus of claim 1, further comprising:
a power module configured to supply power for the stylus to emit the electrical signal.

14. The stylus of claim 1, wherein the stylus performs modulation on the electrical signal using code, time, frequency, or amplitude.

15. A tip structure of a stylus, used to have a touch sensitive processing apparatus know an axial direction and an angle of inclination which the stylus corresponds to a touch screen through electrical signal emitted by the stylus, the tip structure comprising:
a non-conductive tip section on one end of a penholder;
a first ring electrode surrounding the penholder;
a second ring electrode surrounding the penholder, wherein the second ring electrode is closer to the tip section than the first ring electrode being, the first ring electrode and the second ring electrode are used to emit the electrical signal, wherein the second ring electrode is in direct contact with the tip section; and
a first insulating material configured to have the first ring electrode electrically decouple the second ring electrode.

\* \* \* \* \*